United States Patent
Sung et al.

(10) Patent No.: US 7,221,994 B2
(45) Date of Patent: May 22, 2007

(54) OPERATIONAL MODEL FOR SIMULATING MANUFACTURE FLOW AND SIMULATING METHOD THEREOF

(75) Inventors: Way-Cheng Sung, Tao-Yuan Hsien (TW); Tung-Huang Tsai, Hsin-Chu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 227 days.

(21) Appl. No.: 10/904,383

(22) Filed: Nov. 8, 2004

(65) Prior Publication Data
US 2005/0278161 A1    Dec. 15, 2005

(30) Foreign Application Priority Data
Jun. 9, 2004   (TW) ............................... 93116605 A

(51) Int. Cl.
*G06F 19/00*   (2006.01)
*H01L 21/66*   (2006.01)

(52) U.S. Cl. .................... 700/121; 700/97; 703/22; 707/1; 438/14

(58) Field of Classification Search ............ 700/97, 700/121; 703/22; 707/1; 438/14
See application file for complete search history.

(56) References Cited

U.S. PATENT DOCUMENTS

| 6,720,194 B1 * | 4/2004 | Miller et al. ............... 438/14 |
| 6,968,245 B2 * | 11/2005 | Hsu et al. ................... 700/96 |
| 7,062,342 B1 * | 6/2006 | Feng et al. ................. 700/97 |

FOREIGN PATENT DOCUMENTS

| TW | 536731 | 6/2003 |
| TW | 583560 | 4/2004 |

\* cited by examiner

*Primary Examiner*—Leo Picard
*Assistant Examiner*—Douglas S. Lee
(74) *Attorney, Agent, or Firm*—Winston Hsu

(57) ABSTRACT

The present invention discloses an operational model for simulating a manufacturing flow. The operational model includes an operational block, an operational library, a strategic block and a strategic library. The operational block is built in accordance with operational data of the equipments, and the operational library is built by integrating a plurality of operational blocks. The strategic block is built in accordance with throughput data of the equipments, and the strategic library is built by integrating a plurality of strategic blocks.

15 Claims, 3 Drawing Sheets

OPERATIONAL MODEL FOR SIMULATING MANUFACTURE FLOW AND SIMULATING METHOD THEREOF

BACKGROUND OF INVENTION

1. Field of the Invention

The present invention is related to an operational simulating model, and more particularly, to an operational model for simulating manufacturing flow and a simulating method thereof.

2. Description of the Prior Art

Semiconductor foundries and TFT-LCD foundries are complex manufacturing environments. Each product has to undergo tens to hundreds of different processes. The manufacturing equipments include each kind of process equipments, material transfer equipments, and storage equipments. Therefore, the types, amounts, position and motion flow have enormous influence on the manufacturing flow.

In the past, the semiconductor foundries and TFT-LCD foundries arranged the manufacturing flow in accordance with the specifications provided by the equipment vendors or in accordance with previous experiences. When the equipment is insufficient after being set up, the overall arrangement should be rearranged and sometimes more equipment is required. The prior art method not only makes optimization difficult, but also requires large amounts of time and money.

In addition, when the product is changed, the overall arrangement has to be readjusted. The method of prior art alteration is similar to building a new foundry in accordance with the specification provided by the equipment vendors or the previous experiences. There might be a shortage of equipments, or some equipments might be left unused. Rearrangement and readjustment are both costly and time consuming.

Therefore before building a new operational line or changing a manufacturing flow, it is compulsory to perform a simulation to reduce risks and expense. So far, equipment vendors have been performing manufacturing flow simulations for their own products. Some foundry simulation software has turned up in the market for manufacturing flow simulations to gain the best throughput layout. Nevertheless this type of simulating model cannot work out in accordance with a certain operational flow or a certain running strategy, i.e. the simulating model cannot perform in accordance with a specific requirement. Consequently, the model will not fit the requirements of foundry-building (ex: 12-inch wafer foundries) layouts in the future.

SUMMARY OF INVENTION

It is therefore a primary objective of the claimed invention to provide an operational model having an operational library and a strategic library to solve the aforementioned problem of simulating models with limited flexibility.

According to the claimed invention, an operational model simulating manufacturing flow is disclosed. The invention includes a plurality of operational blocks, an operational library, a plurality of strategic blocks, and a strategic library. The operational blocks are built in accordance with each operational data of the manufacturing equipments, and the operational library is built in accordance with integrating a plurality of operational blocks. The strategic blocks are built in accordance with each throughput data of the equipments, and the strategic library is built in accordance with integrating a plurality of strategic blocks.

The present invention is further directed to a simulating method of planning manufacturing flow. The simulating method is utilized for building a plurality of operational blocks and an operational library is built by integrating the operational blocks. Furthermore, a plurality of strategic blocks is built in accordance with each throughput data of the equipments and a strategic library is built by integrating the strategic blocks. Finally, an operational model is built by collecting data from the operational library and the strategic library. The manufacturing flow simulation is carried out in accordance with the operational model.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
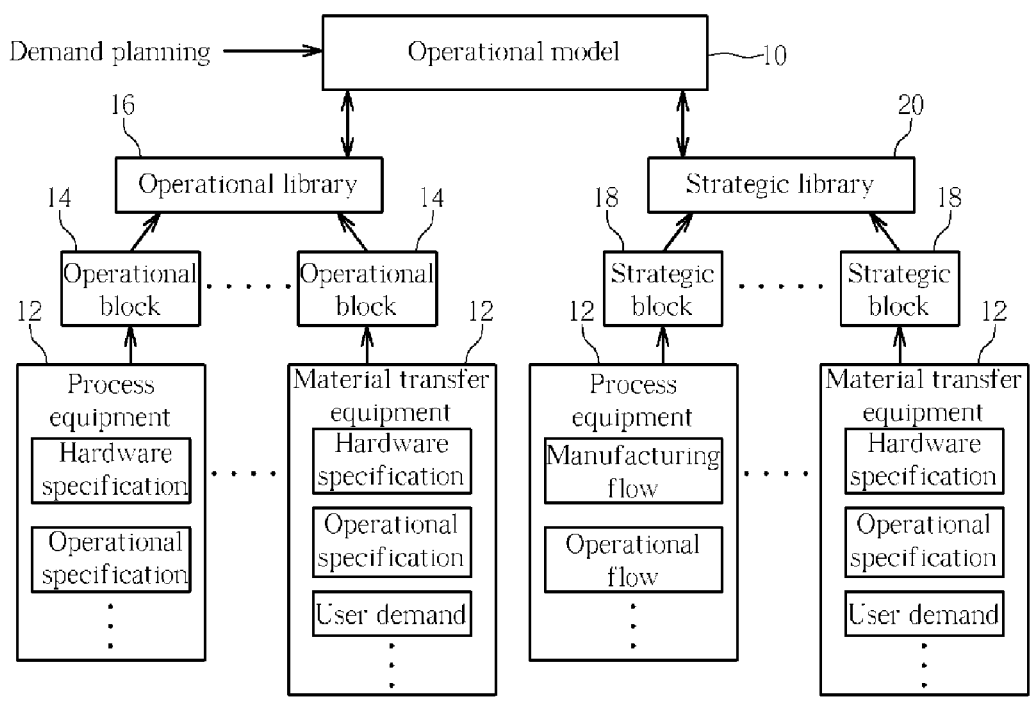
FIG. 1 is a schematic diagram of setting up an operational model according to the present invention.
Figure 2:
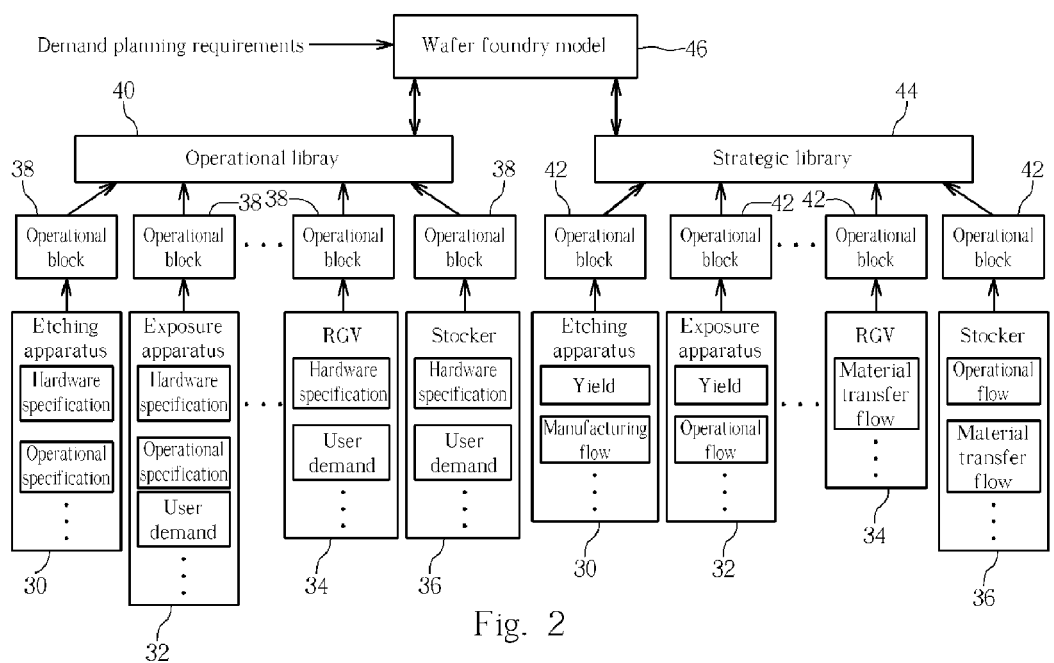
FIG. 2 is a schematic diagram of a preferred embodiment according to the present invention.

Please refer to FIG. 1 and FIG. 2. FIG. 1 is a schematic diagram of an operational model 10 of the present invention. Before a foundry is built, an operational model 10 is built in accordance with each data and motion flow strategy to simulate manufacturing flow. The present invention provides an efficient and flexible simulating method to build the operational model 10. Firstly, each operational data of each kind of manufacturing equipments 12 is collected to build a corresponding operational block 14. Next, an operational library 16 is built by integrating each operational block. The operational library 16 includes each operational block 14 formed by each type of process equipments, material transfer equipments, and material storage equipments. Additionally, each throughput data is collected to build the corresponding strategic block 18. Thereafter a strategic library 20 is built by integrating each operational block 18. The strategic library 20 includes each strategic block 18 formed by each type of process equipments, material transfer equipments, and material storage equipments. When operational library 16 and strategic library 20 are built, the user can perform a manufacturing simulation according to the operational model 10 built by collecting the data from the operational library 16 and the strategic library 20 for the demands of building a foundry or changing a manufacturing line.

Please refer to FIG. 2. FIG. 2 is a schematic diagram of an illustrative embodiment described a manufacturing flow of a 12-inch (300 mm) semiconductor foundry. The 12-inch semiconductor foundry includes various manufacturing equipments, such as etching equipments 30, exposure equipments 32, rail guided vehicles (RGV) 34, and stockers 36. Each equipment has its own operational specification such as a hardware specification and a user demand specification. After collecting the relevant data of the equipments, corresponding operational blocks 38 are built in accordance with the data. At least one operational library 40 of 12-inch wafer foundry is built by integrating a plurality of operational blocks 38. On the other hand, each equipment has relevant throughput data such as yield, process flow, operational flow, worker dispatch flow, and material transfer flow. Corresponding strategic blocks 42 are built in accordance with the collected data. At least one strategic library 44 of a 12-inch wafer foundry is built by integrating a plurality of strategic blocks 42.

After the operational library 40 and strategic library 44 are built, the required data such as types, amounts, or position of the equipments can be collected from the two libraries for the demands of building a new foundry or changing manufacturing line, and a 12-inch wafer foundry model 46 is built. If the change of manufacturing line is limited at a certain section, the section operational model is built. When a 12-inch wafer model 46 is established, the manufacturing flow simulation of the 12-inch wafer foundry is performed. If the result of simulation cannot reach the optimization, the data in the library is collected for another time for adjusting the 12-inch wafer foundry model 46 to achieve the goal of optimizing throughput and capital reduction.

For instance, if the result of the simulation shows that the amount of the stockers is not enough, the stocker 36 data of another brand can be pick out from the library or the simulation can be performed at another time by increasing the amount of the stockers to adjust the 12-inch wafer foundry model 46. In addition, the present 12-inch wafer foundry model can directly simulate specific manufacturing strategies. For instance, the 12-inch wafer foundry model 46 can be ordered to perform a certain type of product simulation in advance in order to determine whether the throughput distribution is enough. Therefore, the relevant process equipments, material transfer equipments, and material delivery equipments can be arranged appropriately.

Assistance software is utilized to build the operational blocks 38, the operational library 40 by integrating a plurality of operational blocks 38, the strategic blocks 42, and the strategic library 44 by integrating a plurality of strategic blocks 42 in the 12-inch wafer foundry. The built blocks and libraries can be exchanged or sold to other companies to reduce the cost of building the same blocks or libraries. Therefore the industry can be promoted expeditiously.

Figure 3:
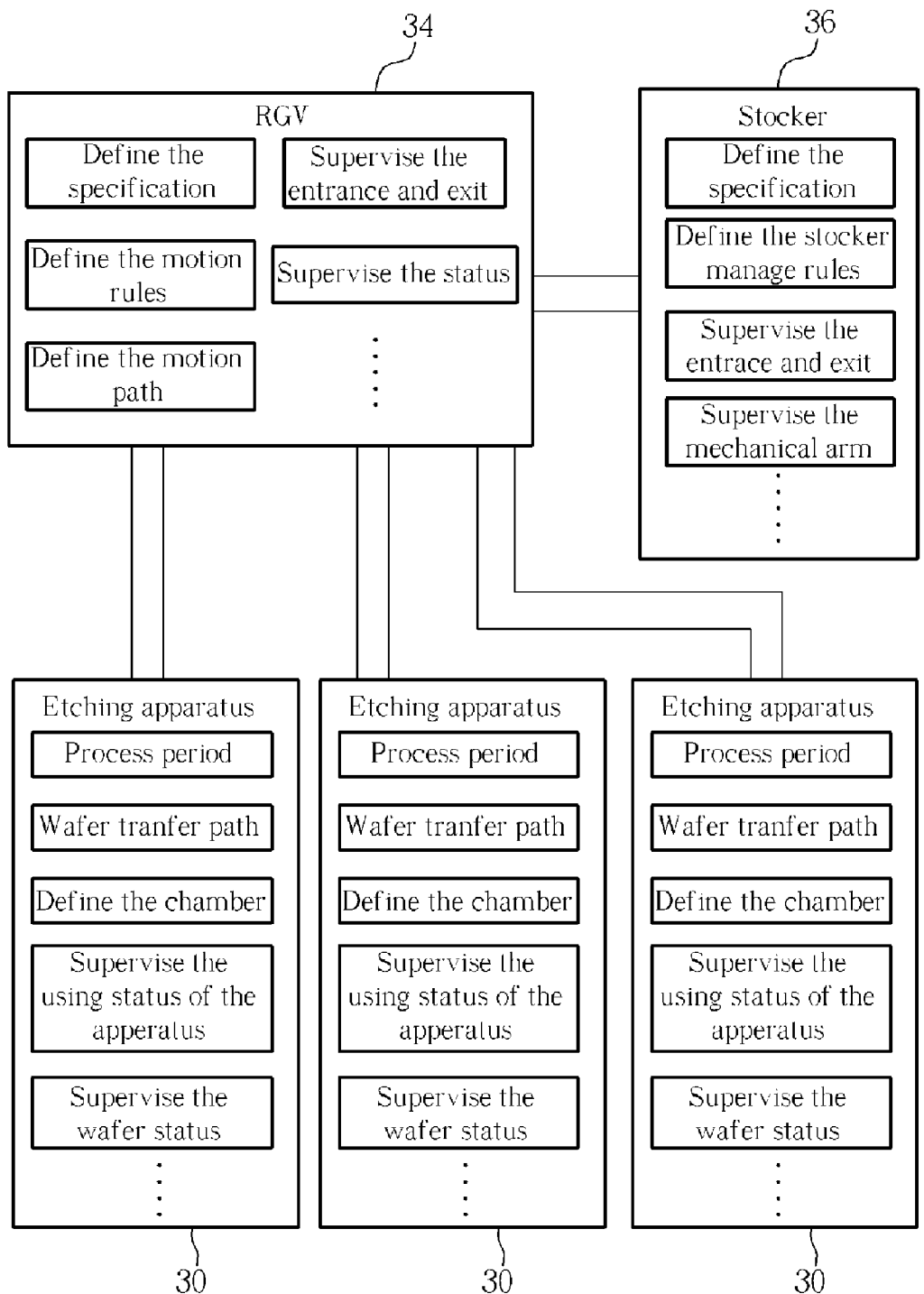
FIG. 3 is a schematic diagram of a layout of a manufacturing section according to the present invention.

Following is a detailed description of the illustrative embodiment. Please refer to FIG. 3. FIG. 3 is a schematic diagram of a layout of an etching section in the 12-inch wafer foundry. The stockers are used to store finished products and semi-finished products, and a mechanical arm is in each stocker 36. The rail guided vehicles are responsible for transferring wafers between the stockers 36 and the etching equipments 30, and the etching equipments 30 are used for performing the etching processes. According to the claimed etching section model, when the stocker 36 model is being built, the stocker specification and the manage rules have to be defined in advance. The supervision of utility rates for the entrance and exit of the stocker and the mechanical arm has to be considered as the simulation is performing. Accordingly, when the rail guided vehicle 34 model is being built, the rail guided vehicle specification and the manage rules have to be defined in advance. The supervision of the using status for the entrance and exit of the rail guided vehicle has to be considered as the simulation is being performed. The rail guided vehicle motion rules and the path layout of the rail guided vehicle is classified into the layout chosen by the model of the rail guided vehicles 34 or by the automatic mode of the system. With regard to the model of the etching equipments 30, each recipe period, wafer transfer path in the machine, and transfer time has to be defined. As for different chambers, the definitions of the specification will be different. The using status and the wafer status has to be supervised as the simulation is performing. Therefore, the rail guided vehicles 34 can position a batch of wafers at the entrance of the etching equipments 30 or take away the process-finished wafers. The complete manufacturing line model of the etching section is built by the definition data and the supervised status of each relevant equipment. The 12-inch wafer foundry model 46 is built by integrating a plurality of process section models.

In contrast to the prior art layout of building a new foundry, the present invention has the advantage of simulating each manufacturing condition in advance. Therefore, the adjusting time and cost is saved and the optimum throughput is carried out. In addition, the present invention can be used to predict the efficiency of a rearranged manufacturing line or an expanded foundry for evaluating benefits. The prior art foundry cannot perform simulation before rearranging or building a new manufacturing line. Besides, the prior art simulating model of manufacturing flow is designed only for constant process equipments offered by a certain vendor. The deficiencies turn up during realistic operation and will cost severe time and extra expense.

The user can simulate an entire or a partial manufacturing area in advance to improve the manufacturing flow. Then, a rearrangement or a construction is built in accordance with the optimum outlay. The present invention can efficiently save time and capital and can be used for optimization in both the present and the future.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A simulating method of manufacturing flow which is applied in a semiconductor foundry, the simulating method comprising:
    building a plurality of operational blocks in accordance with operational data of each manufacturing equipment;
    integrating the operational blocks and building at least one operational library;
    building a plurality of strategic blocks in accordance with throughput data of each manufacturing equipment;
    integrating the strategic blocks and building at least one strategic library;
    collecting data from the operational library and strategic library and building a operational model; and
    performing manufacturing flow simulation in accordance with the operational model.

2. The method of claim 1 wherein the manufacturing equipments include process equipments, transferring equipments, material delivering equipments and material storage equipments.

3. The method of claim 1 wherein the operational equipments include etching equipments, exposure equipments, rail guided vehicles (RGV) and stockers.

4. The method of claim 1 wherein the operational data comprises each hardware specification data, operational data, and user demand specification data of the manufacturing equipments.

5. The method of claim 1 wherein the throughput data comprises each manufacturing flow data, operational procedure data, and material transfer flow data of the manufacturing equipments.

6. The method of claim 1 wherein when the operational model is built, a 12-inch wafer foundry model is established.

7. The method of claim 1 wherein when the operational model is built, a section manufacturing line is established.

8. An operational model simulation of a 12-inch wafer foundry built in accordance with the method of claim 1.

9. An operational model simulating the manufacturing flow of a semiconductor foundry, the operational model comprising:
   an operational library including a plurality of operational blocks built in accordance with each operational data of each manufacturing equipment; and
   a strategic library including a plurality of strategic blocks built in accordance with each throughout data of each manufacturing equipment.

10. The model of claim 9 wherein the manufacturing equipments include process equipments, material transfer equipments and material storage equipments.

11. The model of claim 9 wherein the process equipments include etching equipments, exposure equipments, rail guided vehicles (RGV) and stockers.

12. The model of claim 9 wherein the operational data comprises each hardware specification data, operational specification data, and user demand specification data of the manufacturing equipments.

13. The model of claim 9 wherein the throughput data comprises each manufacturing flow data, operational procedure data, and material transfer flow data of the manufacturing equipments.

14. The model of claim 9 wherein the operational model is a complete 12-inch wafer foundry model.

15. The model of claim 9 wherein operational model is a section manufacturing line model.

* * * * *